(12) United States Patent
Lefebvre

(10) Patent No.: US 11,686,253 B2
(45) Date of Patent: Jun. 27, 2023

(54) THROUGH-FLOW GAS TURBINE ENGINE WITH ELECTRIC MOTOR AND ELECTRIC GENERATOR

(71) Applicant: PRATT & WHITNEY CANADA CORP., Longueuil (CA)

(72) Inventor: Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/663,698

(22) Filed: May 17, 2022

(65) Prior Publication Data

US 2022/0275761 A1 Sep. 1, 2022

Related U.S. Application Data

(60) Division of application No. 16/897,776, filed on Jun. 10, 2020, now Pat. No. 11,384,693, which is a continuation-in-part of application No. 16/875,451, filed on May 15, 2020, now abandoned, and a continuation-in-part of application No. 16/875,470, filed on May 15, 2020, now Pat. No. 11,408,340.

(51) Int. Cl.
*F02C 7/32* (2006.01)
*F02C 6/14* (2006.01)
*F02C 7/268* (2006.01)
*F02C 6/20* (2006.01)

(52) U.S. Cl.
CPC ............... *F02C 7/32* (2013.01); *F02C 6/14* (2013.01); *F02C 6/206* (2013.01); *F02C 7/268* (2013.01); *F05D 2220/323* (2013.01); *F05D 2220/76* (2013.01); *F05D 2240/60* (2013.01); *F05D 2260/4031* (2013.01)

(58) Field of Classification Search
CPC .. F02C 7/32; F02C 6/206; F05D 2220/76–77; B60K 20/547; H02K 7/1823; F01D 15/10; B64D 27/10–14; B64D 27/24; B64D 2027/026
See application file for complete search history.

(56) References Cited

U.S. PATENT DOCUMENTS

| | | | | |
|---|---|---|---|---|
| 2,169,968 | A | * | 8/1939 | Towner ............... A62B 18/084 24/316 |
| 4,109,743 | A | | 8/1978 | Brusaglino et al. |
| 4,554,989 | A | | 11/1985 | Gruich et al. |

(Continued)

FOREIGN PATENT DOCUMENTS

EP 3335995 6/2018

*Primary Examiner* — Stephanie Sebasco Cheng
(74) *Attorney, Agent, or Firm* — Norton Rose Fulbright Canada LLP

(57) ABSTRACT

A through-flow gas turbine engine includes a core comprising multiple spools rotatable about a center axis. An accessory gearbox (AGB) is drivingly engaged to the core and disposed aft of the outlet. A reduction gearbox (RGB) is drivingly engaged to the core and disposed forward of the inlet. The RGB has an RGB output to provide rotational output to a rotatable load. An electric motor is drivingly engaged to the rotatable load. An electric generator is configured to provide electrical power to the electric motor. the electric motor and the electric generator are disposed axially adjacent one another, and axially between the outlet and the AGB.

10 Claims, 5 Drawing Sheets

(56) References Cited

U.S. PATENT DOCUMENTS

| | | |
|---|---|---|
| 5,537,822 A * | 7/1996 | Shnaid .................... F02C 6/16 60/659 |
| 5,867,979 A | 2/1999 | Newton et al. |
| 7,770,377 B2 | 8/2010 | Rolt |
| 7,802,757 B2 | 9/2010 | Dooley et al. |
| 7,854,582 B2 | 12/2010 | Ullyott |
| 7,926,287 B2 | 4/2011 | Ullyott et al. |
| 8,226,522 B2 | 7/2012 | Lemmers, Jr. |
| 8,232,700 B2 | 7/2012 | Dooley |
| 8,461,704 B2 | 6/2013 | McLoughlin et al. |
| 9,032,702 B2 | 5/2015 | Beier |
| 9,601,970 B2 | 3/2017 | French et al. |
| 10,072,582 B2 | 9/2018 | Wotzak |
| 10,371,007 B2 | 8/2019 | Cigal et al. |
| 10,408,133 B2 * | 9/2019 | Wintgens .................. F02C 7/32 |
| 10,458,340 B2 | 10/2019 | Lefebvre |
| 10,465,611 B2 | 11/2019 | Durocher et al. |
| 10,533,559 B2 | 1/2020 | Plante et al. |
| 10,981,660 B2 | 4/2021 | Mackin |
| 2013/0098060 A1 | 4/2013 | Suciu et al. |
| 2015/0315974 A1 | 11/2015 | Suciu et al. |
| 2016/0097328 A1 | 4/2016 | Wintgens |
| 2017/0211477 A1 | 7/2017 | Menheere et al. |
| 2017/0291712 A1 | 10/2017 | Mimmelmann et al. |
| 2017/0320584 A1 | 11/2017 | Menheere |
| 2017/0370284 A1 | 12/2017 | Harvey et al. |
| 2018/0023480 A1 | 1/2018 | Lefebvre |
| 2018/0023482 A1 | 1/2018 | Lefebvre |
| 2018/0073429 A1 * | 3/2018 | Dubreuil ................... F02C 7/32 |
| 2018/0135522 A1 | 5/2018 | Mitrovic et al. |
| 2018/0080378 A1 | 8/2018 | Forest et al. |
| 2018/0223739 A1 * | 8/2018 | Dubreuil ............... F04D 29/321 |
| 2018/0223740 A1 * | 8/2018 | Forest .................... F02C 7/268 |
| 2018/0251226 A1 | 9/2018 | Fenny et al. |
| 2019/0085715 A1 * | 3/2019 | van der Merwe ........ F01D 1/24 |
| 2019/0323426 A1 | 10/2019 | Mackin |
| 2020/0049025 A1 | 2/2020 | Morgan et al. |
| 2023/0021361 A1 * | 1/2023 | Tunzini ................. B64D 41/00 |

* cited by examiner

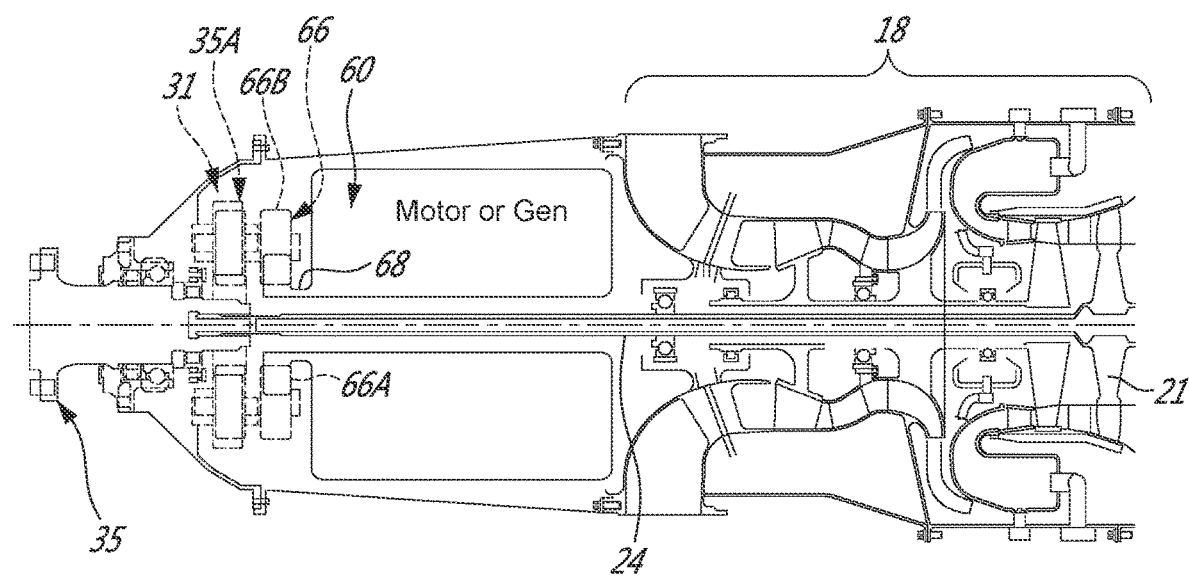

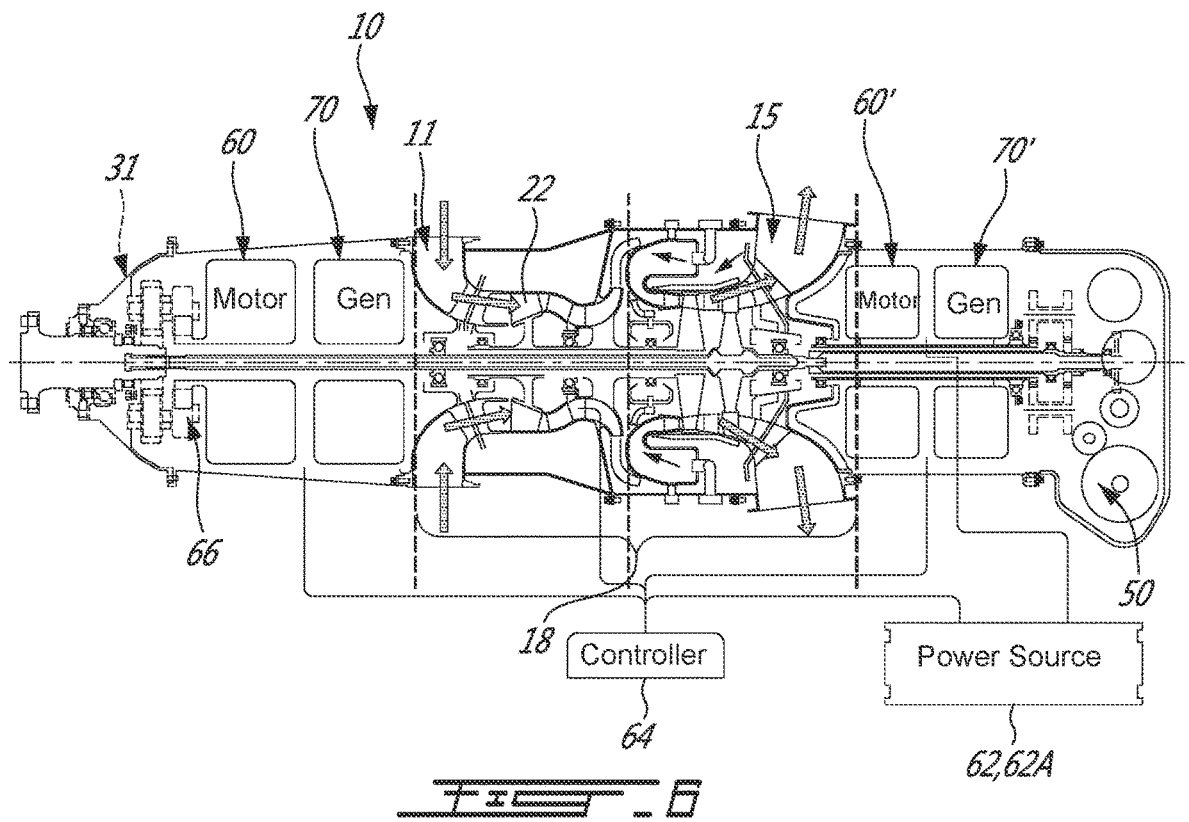
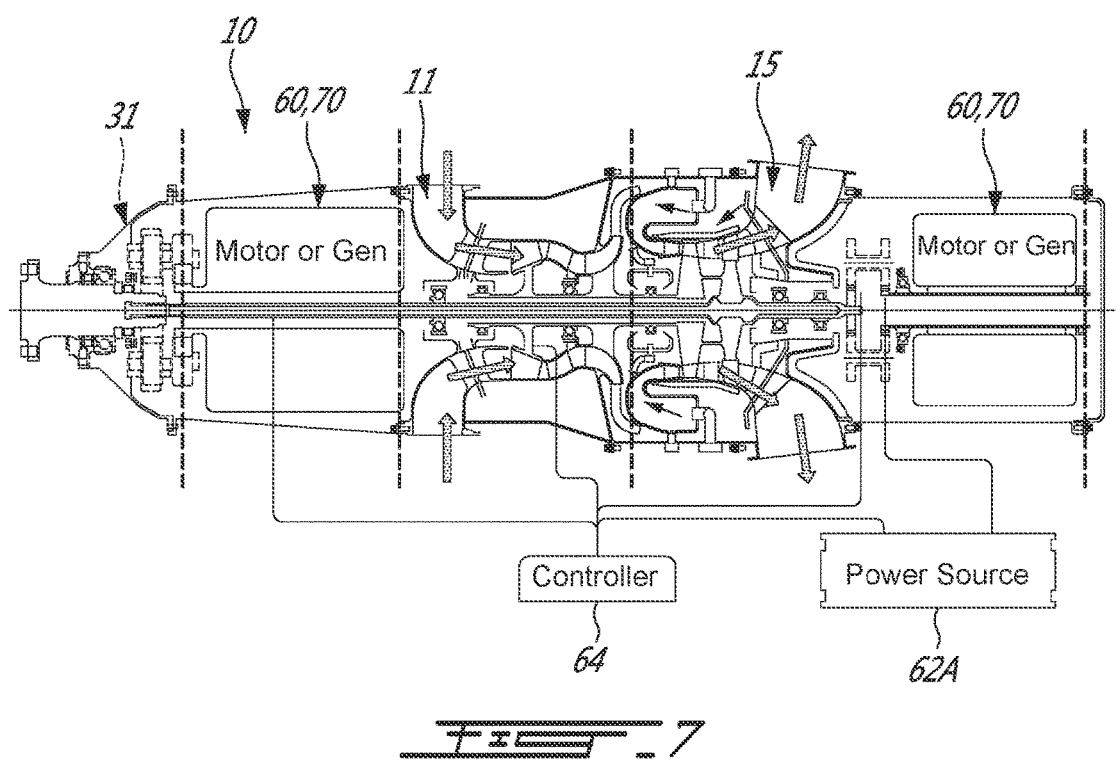

THROUGH-FLOW GAS TURBINE ENGINE WITH ELECTRIC MOTOR AND ELECTRIC GENERATOR

CROSS-REFERENCE TO RELATED APPLICATIONS

This application is a divisional of U.S. patent application Ser. No. 16/897,776 filed Jun. 10, 2020, which is a continuation-in-part of U.S. patent application Ser. No. 16/875,451 filed May 15, 2020 and U.S. patent application Ser. No. 16/875,470 filed May 15, 2020, the entirety of both of which is incorporated by reference herein.

TECHNICAL FIELD

The application relates generally to gas turbine engines and, more particularly, to gas turbine engines with a through-flow core.

BACKGROUND

Through-flow gas turbine engines draw air into a central core of the engine near a forward portion of the engine, and exhaust combustion gases from an aft portion of the engine. Gases therefore flow through the core from the front to the rear of the engine.

In some conventional through-flow engines, air is drawn into the core and compressed with a compressor stage driven by a first turbine stage. A second turbine stage, separate from the first turbine stage and rotating a separate shaft, provides the rotational output of the engine.

SUMMARY

There is disclosed a through-flow gas turbine engine, comprising: a core comprising multiple spools rotatable about a center axis of the gas turbine engine, each spool configured to extract energy from combustion gases, the air and combustion gases configured to flow through the core in an aft direction from an air inlet at a forward end of the core to an outlet at an aft end of the core; an accessory gearbox (AGB) drivingly engaged to the core and disposed aft of the outlet; a reduction gearbox (RGB) drivingly engaged to the core and disposed forward of the inlet, the RGB having an RGB output to provide rotational output to a rotatable load; and an electric motor drivingly engaged to the rotatable load, and an electric generator configured to provide electrical power to the electric motor, the electric motor and the electric generator disposed axially adjacent one another, and disposed axially between the outlet and the AGB or axially between the inlet and the RGB.

There is disclosed a method of modifying a through-flow gas turbine engine comprising multiple spools drivingly engaged to a reduction gearbox (RGB), to an accessory gearbox (AGB) and to a rotatable load, the method comprising: mounting an electric motor within the gas turbine engine and drivingly engaging the electric motor to a rotatable load, mounting an electric generator within the gas turbine engine to provide electrical power to the electric motor, positioning one of the electric motor and the electric generator axially between an exhaust outlet of the gas turbine engine and the AGB, and positioning the other of the electric motor and the electric generator axially between an air inlet of the gas turbine engine and the RGB.

There is disclosed a through-flow gas turbine engine, comprising: a core comprising multiple spools rotatable about a center axis of the gas turbine engine, each spool configured to extract energy from combustion gases, the air and combustion gases configured to flow through the core in an aft direction from an air inlet at a forward end of the core to an outlet at an aft end of the core; an accessory gearbox (AGB) drivingly engaged to the core and disposed aft of the outlet; a reduction gearbox (RGB) drivingly engaged to the core and disposed forward of the inlet, the RGB having an RGB output to provide rotational output to a rotatable load; and an electric motor drivingly engaged to the rotatable load, and an electric generator configured to provide electrical power to the electric motor, one of the electric motor and the electric generator disposed axially between the outlet and the AGB and the other of the electric motor and the electric generator disposed axially between the inlet and the RGB.

DESCRIPTION OF THE DRAWINGS

Reference is now made to the accompanying figures in which:

FIG. 2 is a schematic cross-sectional view of a part of the gas turbine engine of FIG. 1;

FIG. 6 is a schematic cross-sectional view of another configuration of the through-flow gas turbine engine; and FIG. 7 is a schematic cross-sectional view of yet another configuration of the through-flow gas turbine engine.

DETAILED DESCRIPTION

Figure 1:
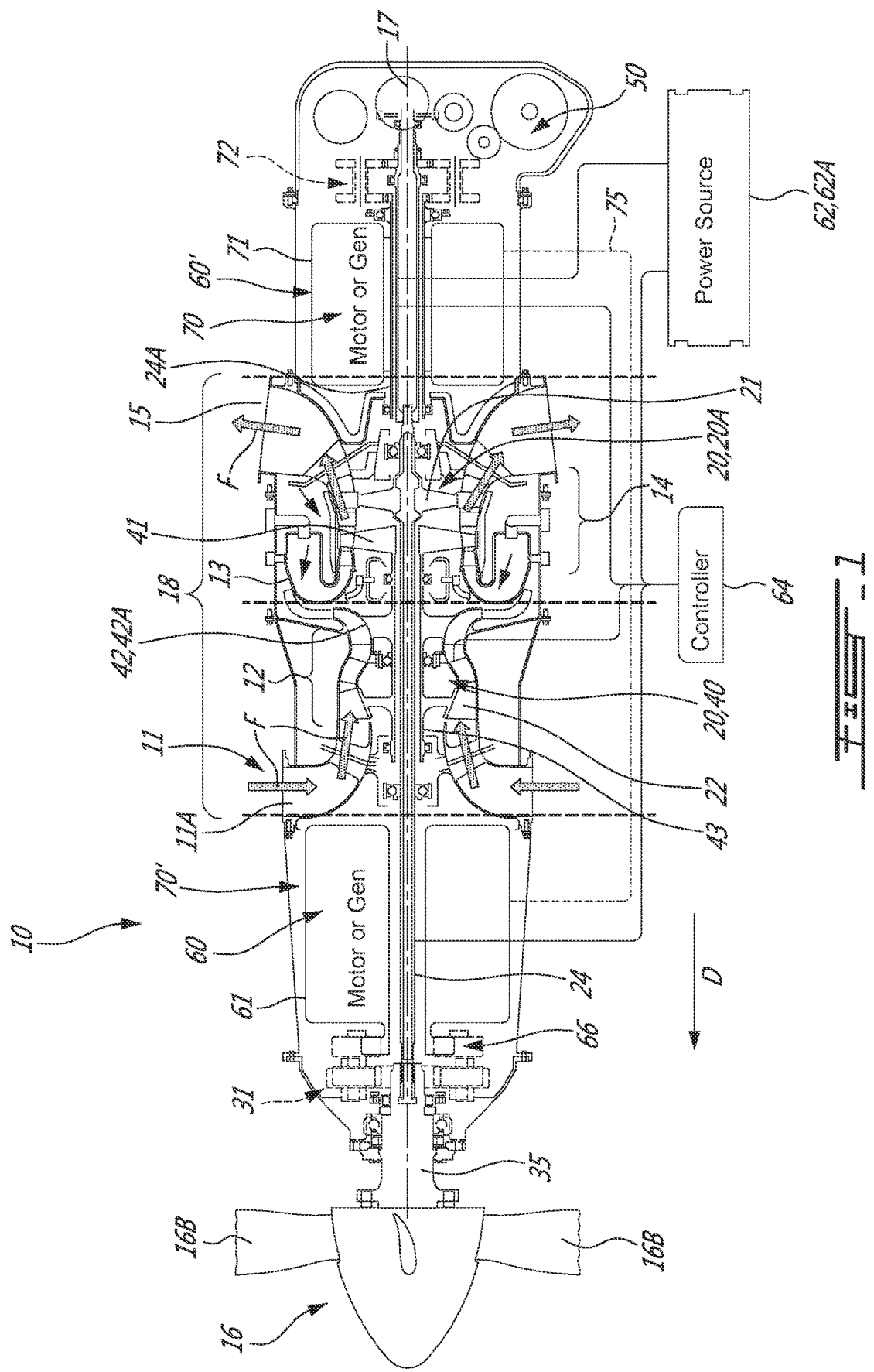
FIG. 1 is a schematic cross-sectional view of a through-flow gas turbine engine.

FIG. 1 illustrates a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust outlet 15 through which the combustion gases exit the gas turbine engine 10. The gas turbine engine 10 has a longitudinal center axis 17. The engine 10 in FIG. 1 is a turboprop engine 10 and includes a propeller 16 which provides thrust for flight and taxiing. The propeller 16 includes propeller blades 16B which rotate about the center axis 17 to provide thrust.

The gas turbine engine 10 (sometimes referred to herein simply as "engine 10") has a central core 18 through which gases flow and which includes most of the turbomachinery of the engine 10. The engine 10 is a "through-flow" engine 10 because gases flow through the core 18 from the air inlet 11 at a forward or front portion of the engine 10, to the exhaust outlet 15 at an aft or rear portion of the engine 10. This is in contrast to "reverse-flow" gas turbine engines in which gases flow through the core of the engine from an aft portion to a front portion. The direction of the flow of gases through the core 18 of the engine 10 is shown in FIG. 1 with arrows F. The direction of the flow of gases through the core 18 of the engine 10 can be better appreciated by considering that the gases flow through the core 18 opposite to a direction of travel D along which the engine 10 moves during flight. Stated differently, gases flow through the engine 10 from a front end of the core 18 towards a rear end of the core 18.

It will thus be appreciated that the expressions "forward" and "aft" used herein may refer to the relative disposition of components of the engine 10, in correspondence to the "forward" and "aft" directions of the engine 10 and aircraft including the engine 10 as defined with respect to the direction of travel D. In the embodiment shown, a component of the engine 10 that is "forward" or "upstream" of another component is arranged within the engine 10 such that it is located closer to the propeller 16. Similarly, a component of the engine 10 that is "aft" or "downstream" of another component is arranged within the engine 10 such that it is further away from the propeller 16.

Still referring to FIG. 1, the core 18 of the engine 10 has multiple spools 20. One or more of the spools 20 rotate about the center axis 17 to perform compression to pressurize the air received through the air inlet 11, and to extract energy from the combustion gases before they exit the core 18 via the exhaust outlet 15 at an aft end of the core 18. The core 18 may include other components as well, including, but not limited to, gearboxes, tower shafts, and bleed air outlets.

A first spool 20A includes at least one component to extract energy from the combustion gases that is part of the turbine section 14. More particularly, the first spool 20A has a low pressure turbine 21 which extracts energy from the combustion gases. In FIG. 1, the first spool 20A is free of a compressor component for pressurizing air from the air inlet 11.

Still referring to FIG. 1, the engine 10 includes a second spool 40 with at least one component to compress the air that is part of the compressor section 12, and at least one component to extract energy from the combustion gases that is part of the turbine section 14. The second spool 40 is also disposed along the center axis 17 and includes a high pressure turbine 41 drivingly engaged (e.g. directly connected) to a high pressure compressor 42 by a high pressure shaft 43. The low pressure turbine 21 (sometimes referred to herein simply as "LPT 21") in FIG. 1 is separated mechanically from a low pressure compressor 22 (sometimes referred to herein simply as "LPC 22"). The LPC 22 is part of the second spool 40 and is drivingly engaged to the high pressure turbine 41 and to the high pressure compressor 42 by the high pressure shaft 43. Both the LPT 21 and the LPC 22 are disposed along the center axis 17. In the depicted embodiment, both the LPT 21 and the LPC 22 are axial rotatable components having an axis of rotation that is coaxial with the center axis 17. They can each include one or more stages of rotors and stators, depending upon the desired engine thermodynamic cycle, for example. Similarly to the LPT 21 and the LPC 22, the high pressure turbine 41 (sometimes referred to herein simply as "HPT 41") and the high pressure compressor 42 (sometimes referred to herein simply as "HPC 42") can include axial rotary components. They can also each include one or more stages of rotors and stators, depending upon the desired engine thermodynamic cycle, for example. In the depicted embodiment, the HPC 42 includes a centrifugal compressor 42A or impeller which is driven by the HPT 41. During operation of the engine 10, the HPT 41 drives the HPC 42.

The HPT 41 is forward of the LPT 21, and adjacent to the combustor 13. The HPC 42 is forward of the combustor 13, and aft of the LPC 22. The HPT 41 is aft of the HPC 42. The HPC 42 is disposed axially between the LPC 22 and the HPT 41, and the HPT 41 is disposed axially between the HPC 42 and the LPT 21. The HPT 41 and the LPT 21 are in fluid communication, such that the combustion gases from the combustor 13 flow through the HPT 41 and then through the LPT 21. From this arrangement of the HPT 41 and the HPC 42, it can be appreciated that during operation of the engine 10, the LPC 22 feeds pressurized air to the HPC 42. Therefore, the pressurized air flow produced by the LPC 22 is provided to the HPC 42. In FIG. 1, the HPC 42 is mechanically coupled to the LPC 22 such that HPT 41 performs all of the compression work.

The LPT 21 is aft of the LPC 22. The LPT 21 is forward of the exhaust outlet 15. The LPC 22 is aft of the air inlet 11 and in fluid communication therewith. The LPC 22 is closer to, or at, a forward end of the core 18. The LPC 22 is disposed between the air inlet 11 and the LPT 21 along a direction parallel to the center axis 17. This arrangement of the LPT 21 and the LPC 22 provides for a through-flow engine 10 that has one or more low pressure compressors located at a front of the engine 10 which are driven by one or more rearwardly-positioned turbines. Still referring to FIG. 1, the core 18 and the first spool 20 includes an output drive shaft 24. The drive shaft 24, sometimes also referred to herein as the "power turbine" or "PT" shaft 24, extends forwardly from the LPT 21 and is drivingly engaged thereto. In FIG. 1, the drive shaft 24 is coaxial with the center axis 17 and with the high pressure shaft 43. The drive shaft 24 is concentric with the high pressure shaft 43 and is disposed within the high pressure shaft 43 along some of the length of the drive shaft 24.

In light of the preceding, it can be appreciated that the LPT 21 is the "low pressure" turbine section when compared to the HPT 41, which is sometimes referred to as the "gas generator". The LPT 21 is sometimes referred to as a "power turbine". The turbine rotors of the HPT 41 spin at a higher rotational speed than the turbine rotors of the LPT 21 given the closer proximity of the HPT 41 to the outlet of the combustor 13. The engine 10 shown in FIG. 1 is thus a "two-spool" engine 10.

The HPT 41 and the HPC 42 can have any suitable mechanical arrangement to achieve the above-described functionality. For example, and as shown in FIG. 1, the second spool 40 includes the high pressure shaft 43 extending between the HPC 42 and the HPT 41. The high pressure shaft 43 is coaxial with, and drivingly engaged to, the LPC 22 such that the high pressure shaft 43 drives the LPC 22.

A rotatable load, which in the embodiment shown includes the propeller 16, is mountable to the engine 10, and when mounted, is drivingly engaged (e.g. directly or indirectly connected) to the LPT 21, and is located forward of the LPT 21. In such a configuration, during operation of the engine 10, the LPT 21 drives the rotatable load such that a rotational drive produced by the LPT 21 is transferred to the rotatable load. The rotatable load can therefore be any suitable component, or any combination of suitable components, that is capable of receiving the rotational drive from the LPT 21. The rotatable load may be part of the engine 10, or a component separate from the engine 10 and mechanically linked thereto such as a helicopter rotor.

In the embodiment shown, a reduction gearbox 31 (sometimes referred to herein simply as "RGB 31") is drivingly engaged to the core 18 to be driven by one or more components thereof. In FIG. 1, the RGB 31 is disposed axially between the core 18 and the propeller 16. In FIG. 1, the RGB 31 is disposed axially between the LPC 22 and the propeller 16. In an alternate embodiment, the RGB 31 may be part of the core 18. In FIG. 1, the RGB 31 is mechanically coupled to a front end of the drive shaft 24, which extends between the RGB 31 and the LPT 21. The output drive shaft 24 of the core 18 is thus drivingly connected to the propeller 16 via the RGB 31. The RGB 31 processes and outputs the rotational drive transferred thereto from the LPT 21 via the drive shaft 24 through known gear reduction techniques. The RGB 31 allows for the propeller 16 to be driven at its optimal rotational speed, which may be different from the rotational speed of the LPT 21.

The propeller 16 is mechanically coupled to the output of the RGB 31 via a propeller shaft 35. The output of the RGB 31 is a gear, shaft, spline, or other rotating mechanical component. The propeller shaft 35 allows the rotational drive outputted by the RGB 31 during operation of the engine 10 to be transferred to the propeller 16 to provide propulsion during flight.

Still referring to FIG. 1, the engine 10 also includes an accessory gearbox 50. The accessory gearbox 50 (sometimes referred to herein simply as "AGB 50") receives a rotational output and in turn drives accessories (e.g. fuel pump, starter-generator, oil pump, scavenge pump, etc.) that contribute to the functionality of the engine 10. The AGB 50 can be designed with side-facing accessories, top-facing accessories, or rear-facing accessories depending on the installation needs. The AGB 50 is aft of the core 18. The AGB 50 is aft of the exhaust outlet 15. The AGB 50 is aft of the LPT 21. During operation of the engine 10, the drive shaft 24 or another shaft coupled to the drive shaft 24, transmits a rotational drive of the LPT 21 to the AGB 50 which in turn drives the accessories of the AGB 50. In an alternate possible configuration of the engine 10, an example of which is shown below, the engine 10 is free of an AGB 50. The AGB 50 can be arranged relative to the core 18 of the engine 10 differently than as shown in FIG. 1. For example, the AGB 50 may be mounted on the side of the engine 10, and forward of the exhaust outlet 15. The circumferential angular position of the AGB 50 may be selected to suit specific installation needs. Other positions and arrangements for the AGB 50 are thus possible.

Still referring to FIG. 1, the engine 10 has an electric motor 60. The electric motor 60 is drivingly engaged to the propeller 16 or to some component thereof to providing a rotational output to the propeller 16 to rotate the propeller blades 16B and generate thrust during any suitable aircraft flight condition. The electric motor 60 is provided with an electrical input such as electrical power and generates a mechanical, rotational output to drive the propeller 16. In FIG. 1, the electric motor 60 is provided only with an electrical input and is not also provided with a mechanical input. The output of the electric motor 60 is coupled, directly or indirectly, only to the propeller 16 or components that drive the propeller 16, and is free of mechanical connection to another component of the engine 10. For example, in FIG. 1, the output of the electric motor 60 is coupled to the RGB 31, which is itself coupled to the propeller shaft 35 of the propeller 16.

The electric motor 60 may have any suitable structure or component to achieve the functionality ascribed to it herein. The electric motor 60 may be selected to be sufficiently powerful to drive the propeller 16 either without using fuel in the engine 10, or in conjunction with a reduced amount of fuel being used in the core 18 during at least one mode of operation of the engine 10. Electricity for driving electric motor 60 may be supplied by an electric power source 62 under the control of a suitable controller 64 such as an EEC (Electronic Engine Controller) or FADEC (Full Authority Digital Engine Control). The electric power source 62 may, for example, include one or more batteries 62A, an auxiliary power unit (APU) and/or an electric generator from another engine of the same aircraft onto which the engine 10 is mounted. The controller 64 may be configured to control the operation of the electric motor 60 by providing suitable control signals to the electric motor 60 and/or providing suitable conditioning of the electric power supplied to the electric motor 60 by the electric power source 62. The controller 64 may actuate the amount of electric power supplied to the electric motor 60 in response to control signals it receives, such as for example, commands sent via a control interface (e.g., panel) from a pilot of an aircraft to which engine 10 is mounted. The controller 64 and the electric power source 62 may be configured to supply enough electric power to the electric motor 60 in order to produce some or all of the torque required to rotate the propeller 16 during at least one mode of operation of the aircraft.

The electric motor 60 may comprise one or more rotors and one or more respective stators. In some embodiments, the plurality of rotor/stator pairs may be angularly or circumferentially distributed about a shaft axis of rotation. One or more of rotors may have a respective rotor axis of rotation that is radially offset from a center axis of the electric motor 60. In some embodiments, each rotor axis may be radially offset from the center axis at a substantially uniform offset distance. Each rotor may be drivingly engaged (e.g., coupled via a shaft) to a respective drive gear for transferring motive power from the rotors to the propeller 16. The electric motor 60 may be drivingly engaged to transmit and/or receive motive power to/from the propeller 16 in any suitable manner. In some embodiments, the electric motor 60 may be drivingly engaged to the propeller 16 via the drive gears drivingly engaged to a common gear, which is in turn drivingly engaged with the RGB 31 via suitable meshed gearing. The structure and principle of operation of possible configurations for the electric motor 60 are described in U.S. Pat. No. 8,232,700 and in U.S. patent application 2017/0320584 A1, both of which are assigned to Pratt & Whitney Canada Corp., and the entirety of each of which is incorporated by reference herein. The electric motor 60 may be "built-in" into the engine 10, such that the electric motor 60 has all of its components assembled together to provide a single output to the propeller 16. For example, and as shown in FIG. 1, the electric motor 60 and its components may be housed in an annular electric motor housing 61 which is attached to any suitable fixed structure, such as bearings or a portion of the engine casing. The electric motor 60 may therefore be relatively easily inserted and mounted within the engine 10. Accordingly, the electric motor 60 and its physical integration within the engine 10 may, in some embodiments, allow for modifying an existing through-flow, multiple-spool engine 10 to be provided with the electric motor 60.

Referring to FIG. 1, the engine 10 has an electric generator 70. During operation, the electric generator 70 converts the mechanical output of the core 18 into electrical power that is supplied to the electric motor 60. In FIG. 1, the electric generator 70 is mechanically driven by the core 18. The electric generator 70 is configured to provide electrical power to the electric motor 60. In FIG. 1, the electric generator 70 is a separate component from the electric motor 60. One possible configuration of this separateness may include the electric generator 70 and the electric motor 60 being enclosed in separate containers with wiring extending between them to supply electrical power to the electric motor 60. Another configuration of this separateness is shown in FIG. 1, where the electric motor 60 and the electric generator 70 are physically separate features that are axially spaced apart from each other along the center axis 17. In FIG. 1, the electric generator 70 during operation supplies electrical power only to the electric motor 60.

The electric generator 70 may be "built-in" into the engine 10, such that the electric generator 70 has all of its components assembled together to provide a single, portable structure. For example, and as shown in FIG. 1, the electric generator 70 and its components may be housed in an annular electric generator housing 71 which is attached to the bearings supporting the drive shaft 24 or the AGB 50. The electric generator 70 may therefore be relatively easily inserted and mounted within the engine 10. Accordingly, the electric generator 70 and its physical integration within the engine 10 may, in some embodiments, allow for modifying an existing through-flow, multiple-spool engine 10 to be provided with the electric generator 70.

Referring to FIG. 1, the output drive shaft 24 has a drive shaft section 24A which is a segment of the output drive shaft 24 or a separate shaft coupled thereto to be rotated by the output drive shaft 24. The drive shaft section 24A transmits the rotational output of the LPT 21. The drive shaft section 24A, which is itself driven by the drive shaft 24 of the LPT 21, is drivingly engaged with the electric generator 70 to provide the motive power thereto. The "power turbine" shaft 24 in FIG. 1 thus provides some or all of the mechanical input to the electric generator 70. In an alternate embodiment, the electric generator 70 is driven by another component, such as the HPT 41, to be used as an electrical power source for the electric motor 60.

In FIG. 1, the electric power source 62 is configured to provide electrical power to the electric motor 60, and the electrical generator 70 is configured to provide electrical power to the electric power source 62. The electric motor 60 is thus supplied with electrical power from another electric power source 62, such as the batteries 62A, and the electric generator 70 is connected to the batteries 62A. Thus, in FIG. 1, the electric generator 70 supplies electrical power to the electric motor 60 indirectly via the one or more batteries 62A. Wiring from the controller 64 to the electric motor 60, to the batteries 62A, and to the electric generator 70 coordinates the draw or supply of electrical power. The wiring may be routed outside the structure of the engine 10. The electric generator 70 may be located elsewhere in the engine 10 in alternate configurations. In an alternate embodiment, the electric generator 70 provides electrical power directly to the electric motor 60, such as via wiring 75, and to the batteries 62A simultaneously. The electric generator 70 and the batteries 62A may thus be used to power the electric motor 60 together, or individually. The electric generator 70 may thus charge the batteries 62A and power the electric motor 60 at the same time, and the electric generator 70 may temporarily cease supplying the electric motor 60 with electrical power when the electric motor 60 is supplied with electrical power by the batteries 62A. The controller 64 may provide full digital envelope protection, to optimize "hybrid" operation of the engine 10 through all phases of flight. The controller 64 may be configured to control the operation of the electric motor 60 by optimizing the hybrid engine functionality either via the batteries 62A or directly from the electric generator 70.

Referring to FIG. 1, the starter-generator of, or in, the AGB 50 is a separate component from the electric motor 60 and from the electric generator 70 described above. The electric motor 60 and the electric generator 70 are axially spaced apart from the AGB 50. The electric motor 60 and the electric generator 70 are separate from the AGB 50 and positioned outside of the casing of the AGB 50. The starter-generator of the AGB 50 is spaced apart from the electric motor 60 and from the electric generator 70, and is housed in a separate enclosure. The starter-generator of the AGB 50 may be configured as, or include, an electric starter/generator drivingly engaged to a drive shaft of the core 18, to start rotation of the rotatable components of the core 18, such as the compressor section 12. In certain engine operating conditions, the drive shaft 24 of the core 18 may provide rotational drive to the starter-generator of the AGB 50 to generate electrical power for various functions unrelated to the operation of the engine 10. This functionality of the starter-generator of the AGB 50 is thus separate from that of the electric motor 60 which is used to provide rotational drive only to the propeller 16. Furthermore, although the electric generator 70 may also be driven by the core 18, the electrical power thus generated by the electric generator 70 is supplied only to the electric motor 60 directly or via the batteries 62A. Similarly, although the electric generator 70 may be housed partially or completely within the AGB 50, the electrical power generated by the electric generator 70 is supplied only to the electric motor 60 directly or via the batteries 62A.

Referring to FIG. 1, one of the electric motor 60 and the electric generator 70 is disposed axially between the RGB 31 and the air inlet 11, and the other of the electric motor 60 and the electric generator 70 is disposed axially between the exhaust outlet 15 and the AGB 50. One of the electric motor 60 and the electric generator 70 is axially downstream of the exhaust outlet 15 and axially upstream of the AGB 50, and the other of the electric motor 60 and the electric generator 70 is axially downstream of the RGB 31 and axially upstream of the air inlet 11. The expression "disposed axially" refers to the axial extent of the electric motor 60 and the electric generator 70 fitting within axially-extending spaces (i.e. spaces defined with a distance vector along the center axis 17) between the air inlet 11 and RGB 31 and between the exhaust outlet 15 and the AGB 50. In FIG. 1, the entire axial extent of the electric motor 60 and of the electric generator 70 fits within these axially-extending spaces, such that there is no axial overlap between these electric features (electric motor 60 and electric generator 70) and the components they are axially positioned between. The engine 10 is thus a through-flow, multi-spool gas turbine engine 10 that incorporates an electric motor 60 and an electric generator 70. This "hybrid" architecture allows the engine 10 to generator rotational output from the combustion of fuel in the combustor 13 and from the use of electric power supplied by the electric generator 70 to the electric motor 60.

Different configurations of this hybrid architecture of the engine 10 are possible, and some are described in greater detail below.

Referring to FIG. 1, the electric feature (the electric motor 60 or the electric generator 70) disposed axially between the RGB 31 and the air inlet 11 is also disposed axially between the RGB 31 and the LPC 22. The electric feature (the electric motor 60 or the electric generator 70) is axially downstream of the RGB 31 and axially upstream of the LPC 22. In the configuration shown in FIG. 1, the LPC 22 is the most forward or most upstream compressor component of the compressor section 12. Referring to FIG. 1, the air inlet 11 has an upstream opening 11A through which air enters the air inlet 11. The upstream opening 11A is forward of the LPC 22 and aft of the electric feature (the electric motor 60 or the electric generator 70). The upstream opening 11A is axially between the LPC 22 and the electric feature (the electric motor 60 or the electric generator 70).

Referring to FIG. 1, the electric motor 60 is disposed axially between the RGB 31 and the LPC 22 and the air inlet 11. Positioning the electric motor 60 between the RGB 31 and the LPC 22 places the electric motor 60 in a colder part of the engine 10, which may contribute to improving the working life of the electric motor 60. Positioning the electric motor 60 between the RGB 31 and the LPC 22 may facilitate servicing or repair of the electric motor 60 because the only components that may need to be removed to access the electric motor 60 are the propeller 16 and the RGB 31. Positioning the electric motor 60 between the RGB 31 and the LPC 22 may allow the electric motor 60 to be provided as a stand-alone or self-sufficient module which is free of any structural attachment to the casing of the engine 10. The electric generator 70 in FIG. 1 is disposed axially between the exhaust outlet 15 and the AGB 50. The electric generator 70 in FIG. 1 is driven by the LPT 21. This positioning of the electric generator 70 thus brings it physically closer to the LPT 21, thereby facilitating the mechanical connection between the two components via the drive shaft section 24A of the drive shaft 24. The engine 10 shown in FIG. 1 is thus a through-flow, multi-spool engine with an electric motor 60 built into the engine 10 and disposed in between the RGB 31 and the LPC 22, and an electric generator 70 built into the engine 10 and disposed between the exhaust outlet 15 and the AGB 50.

The positions of the electric motor 60 and the electric generator 70 may be reversed. FIG. 1 shows another possible architecture of the engine 10 in which the positions of the electric features (the electric motor 60 or the electric generator 70) are interchanged. In this architecture of the engine 10, the electric generator is designated with the reference number 70', and is disposed axially between the air inlet 11 and the RGB 31. In this architecture of the engine 10, the electric motor is designated with the reference number 60', and is disposed axially between the exhaust outlet 15 and the AGB 50. In this architecture of the engine 10, the output drive shaft 24, which is itself driven by the LPT 21, is drivingly engaged with the electric generator 70' to provide the motive power thereto. In this architecture of the engine 10, the electric motor 60' provides its rotational output to the drive shaft 24 or to the drive shaft section 24A. The engine 10 may thus be a through-flow, multi-spool engine with an electric generator 70' built into the engine 10 and disposed in between the RGB 31 and the LPC 22, and an electric motor 60' built into the engine 10 and disposed between the exhaust outlet 15 and the AGB 50.

In FIG. 1, the electric motor 60 and the electric generator 70 are coaxial with the spools 20 and with the center axis 17. In an alternate embodiment, the electric motor 60 and/or the electric generator 70 may have components, such as rotor or internal gears, which rotate about an axis that is transverse to the center axis 17, such that the electric motor 60 and/or the electric generator 70 is not coaxial with the spools 20 or the center axis 17. The electric motor 60 is mounted at a location within the engine 10 that is spaced a distance measured in a radial direction from the center axis 17, from the drive shaft 24 of the LPT 21, and from the propeller shaft 35. In FIG. 1, a component of the electric motor 60, such as its rotor and the axis about which the rotor rotates, is spaced a distance measured in a radial direction from the center axis 17, from the drive shaft 24 of the LPT 21, and from the propeller shaft 35. The electric motor 60 is therefore radially offset from the propeller 16 or the drive shaft 24. One or more components of the electric generator 70 may also be radially offset from the propeller 16 or the drive shaft 24 in the same manner as the electric motor 60.

Referring to FIG. 2, the electric motor 60 is indirectly mounted to the propeller shaft 35. The engine 10 includes a forward gear train 66 drivingly engaged to both the output of the electric motor 60 and the RGB 31, so as to drivingly engage the electric motor 60 to the RGB 31. The electric motor 60 is thus indirectly coupled to the propeller attachment via the forward gear train 66. The forward gear train 66 has any suitable arrangement of gearing and ratios to allow an output from the electric motor 60 to be supplied to the RGB 31. In FIG. 2, the electric motor 60 has a motor output shaft 68 which meshes with, and drives, an input gear 66A of the forward gear train 66. An output gear 66B of the forward gear train 66 engages and drives a gear 35A of the RGB 31, to transfer the rotational drive from the motor output shaft 68 to the RGB 31 and ultimately to the propeller 16. In FIG. 2, the forward gear train 66 modifies the speed and torque of the output of the electric motor 60 as desired, to supply the modified output directly to the RGB 31. The forward gear train 66 is disposed axially between the electric motor 60 and the RGB 31. The forward gear train 66 is disposed axially between the electric motor 60 and the propeller 16. The forward gear train 66 is enclosed or housed outside of the electric motor housing 61. In FIG. 2, the forward gear train 66 is a separate component from the electric motor 60, and is separate from the internal gearing of the electric motor 60. In embodiments, one of which is described in greater detail below, the electric motor 60 is coupled directly to the desired component of the propeller 16, and there is no forward gear train 66 provided between the electric motor 60 and the propeller 16.

In FIG. 2, the forward gear train 66 is operable to selectively drivingly engage the electric motor 60 to the RGB 31. The forward gear train 66 allows the electric motor 60 to engage the RGB 31 to transfer a rotational drive thereto, and also allows the electric motor 60 to disengage from the RGB 31 such that the output of the electric motor 60 is not supplied to the propeller 16. This selective engagement may be achieved using any suitable mechanism, such as a clutch. This selective engagement of the electric motor 60 via the forward gear train 66 may allow for the electric motor 60 to provide the sole rotational drive to the propeller 16 via the RGB 31, to provide rotational drive concurrently with the drive shaft 24 of the core 18, or to provide no rotational drive to the RGB 31 (or to the propeller 16) at all such that the RGB 31 is driven entirely by the output of the core 18. This selective engagement of the electric motor 60 may be used, for example, to allow only the electric motor 60 to provide rotational drive to the propeller 16 via the RGB 31 during a cruise, taxi, or descent flight condition. This selective engagement of the electric motor 60 may be used, for example, to allow both the electric motor 60 and the core 18 to provide rotational drive to the propeller 16 via the RGB 31 during a take-off flight condition, such that the electric motor 60 and the output shaft of the core 18 (i.e. the drive shaft 24 of the LPT 21) are operable to concurrently drive the propeller 16 via the RGB 31. The engine 10 may therefore have a dual connection to the RGB 31, and thus to the propeller 16—one output connection from the electric motor 60 and the second output connection from the core 18 and its LPT 21.

Figure 3A:
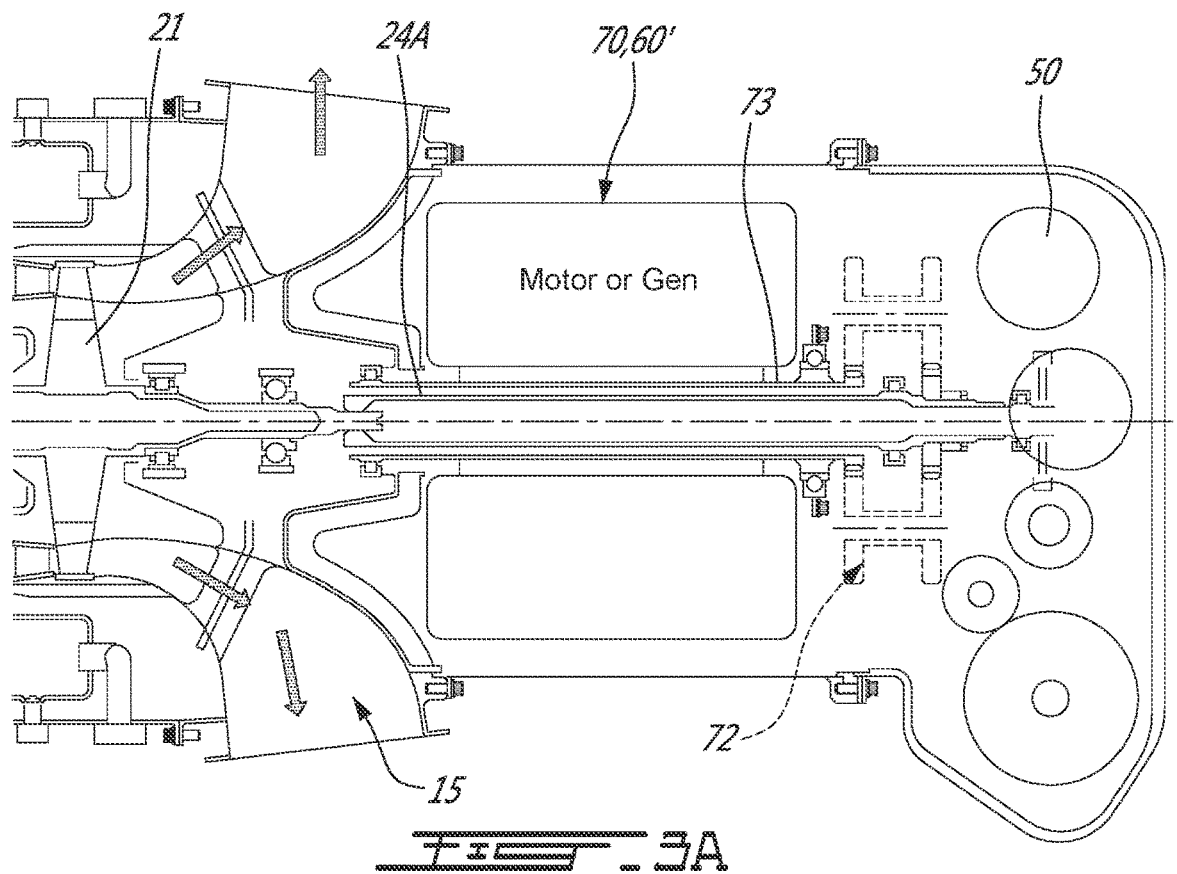
FIG. 3A is a schematic cross-sectional view of another part of the gas turbine engine of FIG. 1.
Figure 3B:
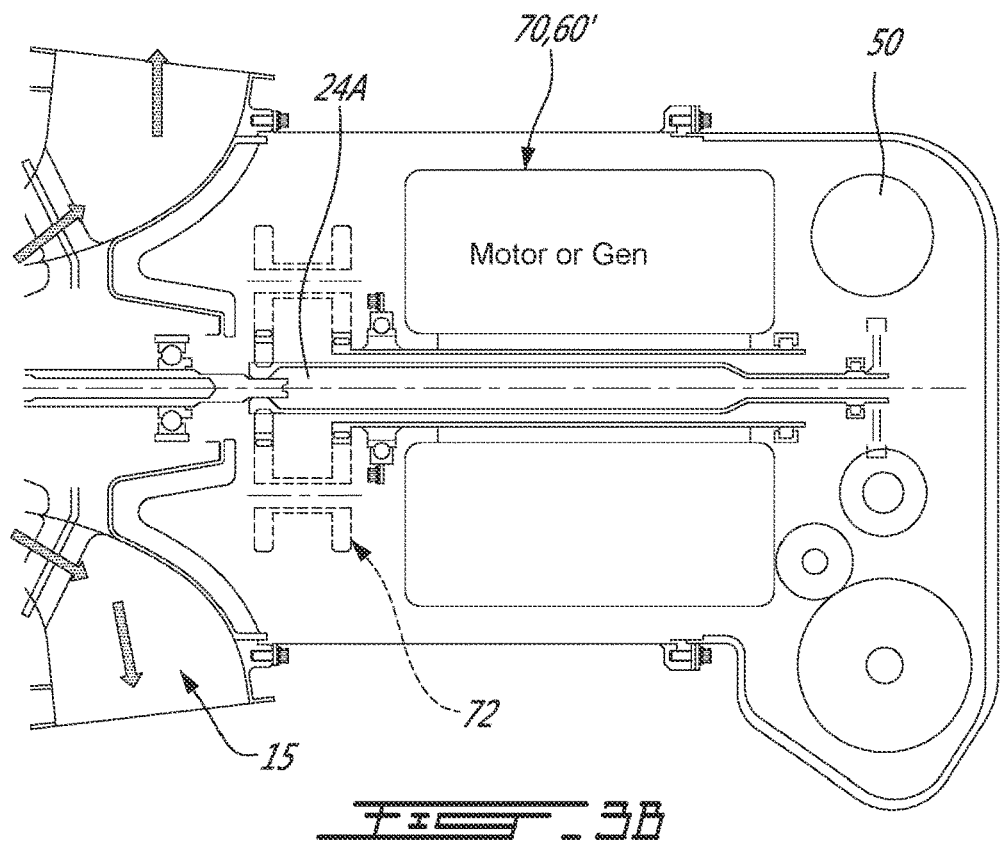
FIG. 3B is another schematic cross-sectional view of the part of the gas turbine engine shown in FIG. 3A, showing another possible arrangement of an aft gear train.

Referring to FIGS. 3A and 3B, the engine 10 also has an aft gear train 72 drivingly engaged to the drive shaft section 24A so as to receive a rotatable input from the drive shaft section 24A, and drivingly engaged to an input shaft 73 of the electric generator 70. The electric generator 70 is thus indirectly coupled to the LPT 21 via the aft gear train 72 to receive motive input directly from the aft gear train 72. The aft gear train 72 has any suitable arrangement of gearing and ratios to allow an output from the LPT 21 to be supplied to the electric generator 70. Referring to FIG. 3A, the aft gear train 72 is drivingly engaged to an input of the AGB 50. In FIG. 3A, the aft gear train 72 is disposed axially between the electric generator 70 and the AGB 50. In FIG. 3B, the aft gear train 72 is disposed axially between the LPT 21 and the electric generator 70. In FIG. 3B, the aft gear train 72 is disposed axially between the exhaust outlet 15 and the electric generator 70. In the architecture of the engine 10 where the electric motor 60' is disposed axially between the exhaust outlet 15 and the AGB 50, the aft gear train 72 is drivingly engaged to the drive shaft section 24A and to the electric motor 60', to transmit the rotatable output of the electric motor 60' to the drive shaft section 24A. Features shown in FIGS. 3A and 3B which are not provided with reference numbers and which are similar to the features shown in other figures bear the same reference numbers as the features shown in other figures, and the description of these features herein applies mutatis mutandis to the features shown in FIGS. 3A and 3B.

Figure 4:
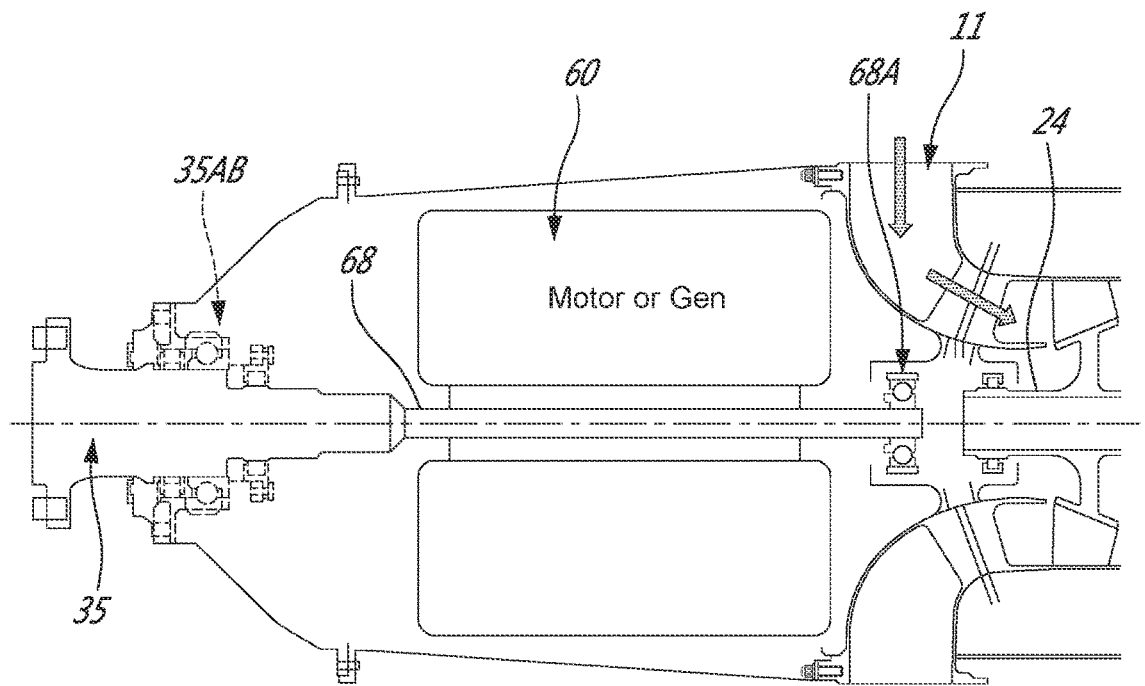
FIG. 4 is a schematic cross-sectional view of yet another part of the gas turbine engine of FIG. 1, showing a possible arrangement of the electric motor.

FIG. 4 shows a configuration of the engine 10 where the electric motor 60 is mounted directly to the rotatable load, i.e. the propeller 16. Features shown in FIG. 4 which are not provided with reference numbers and which are similar to the features shown in other figures bear the same reference numbers as the features shown in other figures, and the description of these features herein applies mutatis mutandis to the features shown in FIG. 4. In FIG. 4, the electric motor 60 is coupled directly to the propeller shaft 35 of the propeller 16, and there is no forward gear train 66 or RGB 31 provided between the electric motor 60 and the propeller 16. The electric motor 60 is thus drivingly engaged only to the propeller 16. This direct configuration may take different forms. In FIG. 4, the motor output shaft 68 of the electric motor 60 is drivingly engaged to the propeller shaft 35 to provide the rotational output of the electric motor 60 to the propeller 16. The motor output shaft 68 is supported by bearings 68A at an aft end of the motor output shaft 68, and is supported via the propeller shaft 35 via its bearings 35AB. In FIG. 4, the propeller shaft 35 and the motor output shaft 68 are integral with one another. In FIG. 4, the propeller shaft 35 and the motor output shaft 68 are one integral shaft with a diameter that varies over its axial length. This direct configuration of the electric motor 60 and the propeller 16 may allow for the rotational output speed of the electric motor 60 to be selected to exactly match the desired rotational speed of the propeller 16 at a specific flight condition, such as cruise or take-off. Therefore, the electric motor 60 may be designed or selected so that its output speed is the same or similar to the rotating speed of the propeller 16. This is in contrast to the output speed of the drive shaft 24 of the LPT 21 or "power turbine" which is typically used to drive the propeller 16, but which often rotates at a much higher speed than the propeller 16 and thus requires speed reduction via the RGB 31. In FIG. 4, the engine 10 is a through-flow, multi-spool engine with an electric motor 60 having a direct shaft connection with the propeller 16. In FIG. 4, the output of the LPT 21 is not be used to drive the propeller 16.

Figure 5:
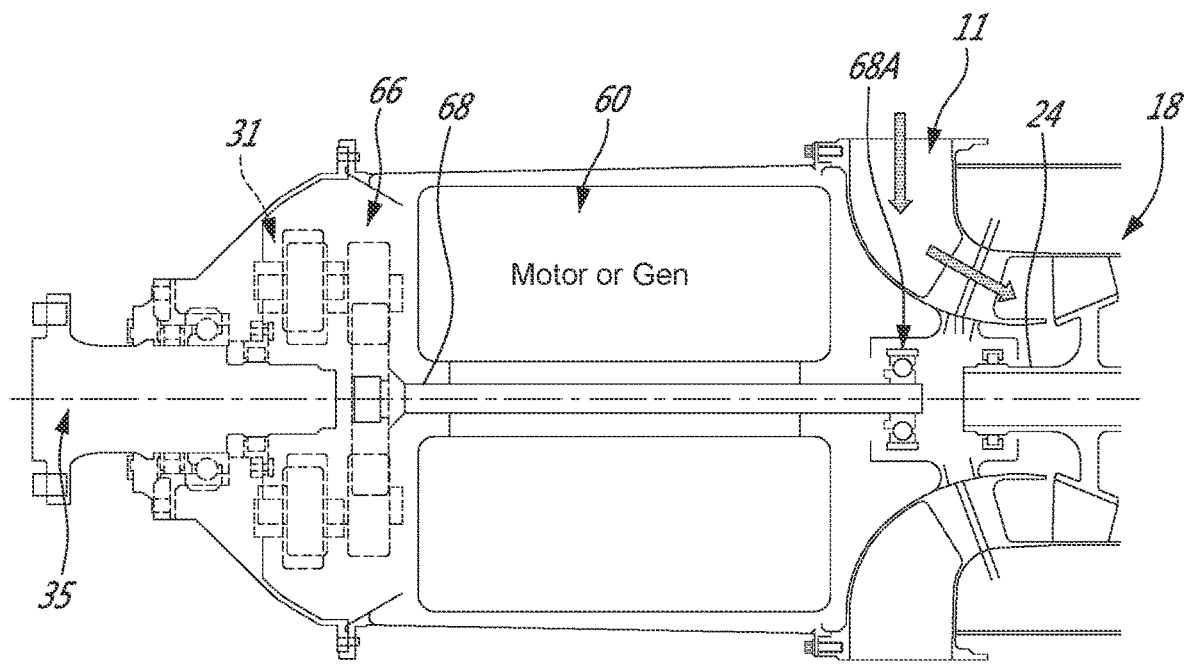
FIG. 5 is another schematic cross-sectional view of the part of the gas turbine engine shown in FIG. 4, showing another possible arrangement of the electric motor.

FIG. 5 shows a configuration of the engine 10 where the electric motor 60 drives the rotatable load, i.e. the propeller 16, via the forward gear train 66 and the RGB 31. Features shown in FIG. 5 which are not provided with reference numbers and which are similar to the features shown in other figures bear the same reference numbers as the features shown in other figures, and the description of these features herein applies mutatis mutandis to the features shown in FIG. 5. In FIG. 5, the electric motor 60 is coupled indirectly to the propeller shaft 35 of the propeller 16, via the forward gear train 66 and the RGB 31 provided between the electric motor 60 and the propeller 16. The motor output shaft 68 is supported by bearings 68A at an aft end of the motor output shaft 68. In FIG. 5, the output of the LPT 21 is not used to drive the propeller 16. The motor output shaft 68 is not drivingly engaged to the core 18 of the engine 10.

In the architecture of the engine 10 shown in FIG. 6, the electric motor 60 and the electric generator 70 are disposed axially adjacent one another. Features shown in FIG. 6 which are not provided with reference numbers and which are similar to the features shown in other figures bear the same reference numbers as the features shown in other figures, and the description of these features herein applies mutatis mutandis to the features shown in FIG. 6. The axially-adjacent electric motor 60 and electric generator 70 may be disposed axially between the LPC 22 and the RGB 31, or between the exhaust outlet 15 and the AGB 50. The electric motor 60 and the electric generator 70 in FIG. 6 are separate from each other in the same manner as explained above. In one possible configuration, the electric motor 60 is disposed axially between the RGB 31 and the electric generator 70, and the electric generator 70 is disposed axially between the air inlet 11 or LPC 22 and the electric motor 60. In another possible configuration also shown in FIG. 6, the electric motor 60' and the electric generator 70' are disposed axially between the exhaust outlet 15 and the AGB 50. The electric motor 60' is disposed axially between the exhaust outlet 15 and the electric generator 70', and the electric generator 70' is disposed axially between the AGB 50 and the electric motor 60'. The electric motor 60,60' and the electric generator 70,70' are disposed in series or sequentially, and are axially adjacent, or next to, one another. The engine 10 disclosed herein may therefore be a through-flow, multi-spool engine 10 with a cooperating electric motor 60,60' and electric generator 70,70' disposed axially adjacent one another.

FIG. 7 shows a configuration of the engine 10 which has no AGB. Features shown in FIG. 7 which are not provided with reference numbers and which are similar to the features shown in other figures bear the same reference numbers as the features shown in other figures, and the description of these features herein applies mutatis mutandis to the features shown in FIG. 7. One of the electric motor 60 and the electric generator 70 is disposed axially between the RGB 31 and the air inlet 11, and the other of the electric motor 60 and the electric generator 70 is disposed axially aft of the exhaust outlet 15. Any accessories of the engine 10 may be distributed to suitable locations in and around the engine 10, and they may be driven by the core 18 or their own motive devices, such as individual electric motors. The configuration of the engine 10 shown in FIG. 7 therefore has no "mechanical" AGB—i.e. an AGB which receives a mechanical rotational input. In this configuration of the engine 10, the electric generator 70 may be used as an engine starter, in addition to its functionality of providing electrical power to the electric motor 60. The engine 10 shown in FIG. 7 is a through-flow, multi-spool engine 10 with an electric motor 60 or an electric generator 70 disposed aft of the exhaust outlet 15, and is free of a mechanical AGB.

Referring to FIG. 1, there is disclosed a method of modifying a through-flow gas turbine engine comprising multiple spools 20 drivingly engaged to the RGB 31, to the AGB 50, and to the rotatable load. The method includes mounting the electric motor 60 within the gas turbine engine 10 and drivingly engaging the electric motor 60 to the rotatable load. The method includes mounting the electric generator 70 within the gas turbine engine 10 to provide electrical power to the electric motor 60. The method includes positioning one of the electric motor 60,60' and the electric generator 70,70' axially between the exhaust outlet 15 and the AGB 50, and positioning the other of the electric motor 60,60' and the electric generator 70,70' axially between the air inlet 11 and the RGB 31.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A through-flow gas turbine engine, comprising:
   a core comprising multiple spools rotatable about a center axis of the gas turbine engine, each spool configured to extract energy from combustion gases, air and combustion gases configured to flow through the core in an aft direction from an air inlet at a forward end of the core to an outlet at an aft end of the core;
   an accessory gearbox (AGB) drivingly engaged to the core and disposed aft of the outlet, the AGB coaxial to the center axis and driving one or more accessories;
   a reduction gearbox (RGB) coaxial to the center axis and drivingly engaged to the core and disposed forward of the inlet, the RGB having an RGB output to provide rotational output to a rotatable load; and
   an electric motor drivingly engaged to the rotatable load, and
   an electric generator drivingly engaged to the core and configured to provide electrical power to the electric motor, the electric motor and the electric generator disposed axially adjacent one another, and disposed coaxially with the center axis between the outlet and the AGB.

2. The through-flow gas turbine engine according to claim 1, wherein AGB has an AGB housing, and wherein the electric generator is at least partially housed within the AGB housing.

3. The through-flow gas turbine engine according to claim 1, wherein the multiple spools of the core comprise a low pressure (LP) spool and a high pressure (HP) spool, and wherein the electric generator is driven by the LP spool via an LP shaft of the LP spool that is coaxial with the center axis.

4. The through-flow gas turbine engine according to claim 3, further comprising an aft gear train drivingly engaged to the LP shaft and to an input shaft of the electric generator.

5. The through-flow gas turbine engine according to claim 4, wherein the aft gear train is drivingly engaged to an input of the AGB.

6. The through-flow gas turbine engine according to claim 4, wherein the aft gear train is disposed axially between the electric generator and the AGB.

7. The through-flow gas turbine engine according to claim 4, wherein the aft gear train is disposed axially between the LP spool and the electric generator.

8. The through-flow gas turbine engine according to claim 7, wherein the aft gear train is disposed axially between the outlet and the electric generator.

9. The through-flow gas turbine engine according to claim 4, wherein the aft gear train is drivingly engaged to both the LP shaft and the electric motor to transmit a rotatable output of the electric motor to the LP shaft.

10. The through-flow gas turbine engine according to claim 3, wherein the electric generator is housed in an annular electric generator housing extending around the LP shaft.

\* \* \* \* \*